(12) United States Patent
Shinagawa

(10) Patent No.: US 9,199,864 B2
(45) Date of Patent: Dec. 1, 2015

(54) ULTRAVIOLET WATER STERILIZATION

(75) Inventor: Rumi Shinagawa, Kyoto (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 433 days.

(21) Appl. No.: 13/395,540

(22) PCT Filed: Apr. 14, 2011

(86) PCT No.: PCT/US2011/032499
§ 371 (c)(1),
(2), (4) Date: Mar. 12, 2012

(87) PCT Pub. No.: WO2012/141709
PCT Pub. Date: Oct. 18, 2012

(65) Prior Publication Data
US 2012/0261319 A1    Oct. 18, 2012

(51) Int. Cl.
*C02F 1/32* (2006.01)
*C02F 1/00* (2006.01)
*C02F 103/00* (2006.01)

(52) U.S. Cl.
CPC ............... *C02F 1/325* (2013.01); *C02F 1/001* (2013.01); *C02F 2103/001* (2013.01); *C02F 2201/3221* (2013.01); *C02F 2201/3222* (2013.01);
(Continued)

(58) Field of Classification Search
CPC ........................................................ C02F 1/32
USPC ......... 210/153, 170.01, 170.03, 747.3, 747.4, 210/747.7, 748.01, 748.1, 748.11, 767, 263, 210/348, 121, 123, 136, 162; 422/20, 21, 422/24, 186, 186.3; 250/250, 493.1, 494.1, 250/503.1
See application file for complete search history.

(56) References Cited

U.S. PATENT DOCUMENTS

| | | | |
|---|---|---|---|
| 4,304,996 A | 12/1981 | Blades | |
| 4,755,292 A | 7/1988 | Merriam | |
| 4,959,142 A * | 9/1990 | Dempo | 210/167.29 |

(Continued)

FOREIGN PATENT DOCUMENTS

| | | | |
|---|---|---|---|
| CN | 101725168 A | * | 6/2010 |
| JP | 2002035763 A | * | 2/2002 |

(Continued)

OTHER PUBLICATIONS

Author Unknown, "Sterilight Silver Series Ultraviolet (US) Sterilizers", www.home-water-purifiers-and-filters.com/sterilight-silver-uv.php, accessed Mar. 1, 2011, 10 pages.

(Continued)

*Primary Examiner* — Walter D Griffin
*Assistant Examiner* — Cameron J Allen
(74) *Attorney, Agent, or Firm* — Dorsey & Whitney LLP

(57) ABSTRACT

Technologies are generally described about a water sterilizing apparatus. In some examples, a water sterilizing apparatus may include a surface water collection apparatus configured to collect surface water; a pipe operably coupled to the surface water collection apparatus and configured to allow water collected by the surface water collection apparatus to flow through the pipe; and a multiple number of UV lamps arranged along an inner wall of the pipe. Further, the water flowing through the pipe is sterilized by UV light from the multiple number of UV lamps.

29 Claims, 9 Drawing Sheets

(52) U.S. Cl.
CPC . *C02F2201/3227* (2013.01); *C02F 2201/3228* (2013.01)

(56) References Cited

U.S. PATENT DOCUMENTS

| | | | |
|---|---|---|---|
| 5,979,054 A * | 11/1999 | Weigold et al. | 29/897.32 |
| 6,436,283 B1 * | 8/2002 | Duke | 210/172.1 |
| 6,481,456 B1 * | 11/2002 | Falkner | 137/206 |
| 6,737,020 B1 | 5/2004 | Horton, III et al. | |
| 7,408,174 B2 | 8/2008 | From et al. | |
| 8,414,779 B2 * | 4/2013 | Levy | 210/748.11 |
| 2005/0023482 A1 * | 2/2005 | Schulz | 250/432 R |
| 2006/0101723 A1 * | 5/2006 | Baeta | 52/16 |
| 2006/0249462 A1 * | 11/2006 | Castellacci | 210/748 |
| 2007/0199868 A1 * | 8/2007 | Volpe | 210/143 |
| 2009/0145855 A1 * | 6/2009 | Day et al. | 210/748 |
| 2009/0291036 A1 * | 11/2009 | Chen et al. | 422/186.3 |
| 2010/0193046 A1 * | 8/2010 | Moroder et al. | 137/357 |

FOREIGN PATENT DOCUMENTS

| | | |
|---|---|---|
| JP | 2007-077589 A | 3/2007 |
| JP | 2010-088826 A | 4/2010 |
| WO | WO 2009/135249 A1 | 11/2009 |

OTHER PUBLICATIONS

Author Unknown, Excel flow calculation:, www.ryutai.co.jp/shiryou/ryuryou/ryusoku-01.XLS, Aug. 31, 2010, with machine translation in English and source website, 3 pages.

International Patent Application No. PCT/US2011/032499 International Search Report dated Jul. 1, 2011, 12 pages.

Iwasaki et al. (Tsuyoshi Hirata, Ed.), "Applicability of Ultraviolet water disinfection", Gihodo Publishing Co., Ltd., Tokyo, Mar. 19, 2008; 128-133.

Kawabata et al., "Water Disinfection by Sterilization Lamps", Journal of the Illuminating Engineering Institute of Japan, 1959, 36(3), 89-96.

Kawamoto, "Air Sterilization with Ultraviolet Radiation and Its Effects", Food Industry, 1970, pp. 33-40.

Otaki, "Inactivation of Water Pathogenic Microorganisms by Ultraviolet Irradiation", Journal of human environmental engineering, 1999, 1(2), 66-71.

Sakai et al., "Growth Inhibition of Microcystis aeruginosa and Release of Intracellular Microcystin by UV", Symposium of the Japan Society on Water Environment, 2007, pp. 202-205.

Texas Water Development Board, "The Texas Manual on Rainwater Harvesting", http://www.twdb.state.tx.us/publications/reports/rainwaterharvestingmanual_3rdedition, 2005, 88 pages.

* cited by examiner

ULTRAVIOLET WATER STERILIZATION

CROSS-REFERENCE TO RELATED APPLICATIONS

This application is the National Stage of International Application No. PCT/US2011/032499, filed Apr. 14, 2011, the disclosure of which is incorporated herein by reference in its entirety.

BACKGROUND

Unless otherwise indicated herein, the materials described in this section are not prior art to the claims in this application and are not admitted to be prior art by inclusion in this section.

Ultraviolet (UV) light is electromagnetic radiation with a wavelength shorter than that of visible light, but longer than X-rays, in the range of 10 nm to 400 nm, and energies from 3 eV to 124 eV. It is so named because the spectrum consists of electromagnetic waves with frequencies higher than those that humans identify as the color violet.

UV irradiation is a sterilization method that uses UV light at sufficiently short wavelength to break down microorganisms. It is used in a variety of applications, such as food, air and water purification. Especially, disinfection using UV radiation is commonly used in wastewater treatment applications and is finding an increased usage in drinking water treatment.

SUMMARY

In an example, a water sterilizing apparatus may include a surface water collection apparatus configured to collect surface water, a pipe operably coupled to the surface water collection apparatus and configured to allow water collected by the surface water collection apparatus to flow through the pipe, and a multiple number of UV lamps arranged along an inner wall of the pipe. Further, the water flowing through the pipe is sterilized by UV light from the multiple number of UV lamps.

In an example, a water sterilizing apparatus may include a surface water collection apparatus configured to collect surface water, a pipe operably coupled to the surface water collection apparatus and configured to allow water collected by the surface water collection apparatus to flow through the pipe, and a multiple number of UV lamps arranged along an outer wall of the pipe. Further, the water flowing through the pipe is sterilized by UV light from the multiple number of UV lamps, and the pipe is transparent to the UV light.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
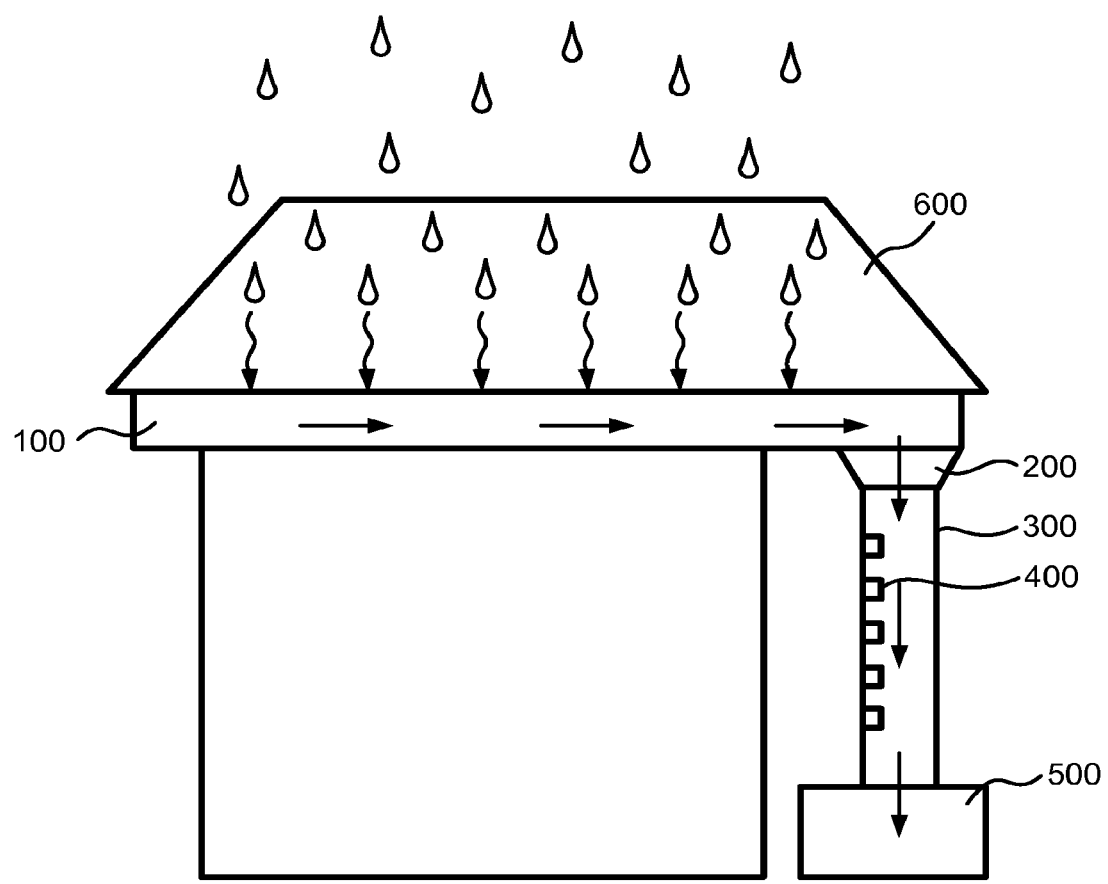
FIG. 1 shows a water sterilizing apparatus.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 shows a water sterilizing apparatus arranged in accordance with at least some embodiments described herein. As depicted, the water sterilizing apparatus may include a surface water collection apparatus 100, a filter 200, a pipe 300, a multiple number of UV lamps 400 and a container 500.

The water sterilizing apparatus may collect surface water that is being or has collected on a surface 600 and sterilize the collected surface water by using UV light. As depicted in FIG. 1, the surface water collected on and flowing off of surface 600 may be received or collected by surface water collection apparatus 100, and the collected water may flow into pipe 300 via filter 200. Further, the surface water flowing through pipe 300 may be sterilized by UV light from UV lamps 400 arranged along pipe 300.

Surface water collection apparatus 100 may be operably coupled to surface 600 to collect surface water thereon. In FIG. 1, surface 600 is illustrated as an inclined roof but it is not limited thereto. In some embodiments, the surface may be a horizontal roof without any inclination or a rooftop of a structure. In some embodiments, the surface may be a terrace. In some embodiments, the surface may be a wall or a window of a building positioned vertically to a ground surface. Various types of surfaces may be operably coupled to surface water collection apparatus 100.

Further, surface water collection apparatus 100 may be operably coupled to pipe 300. One end of surface water collection apparatus 100 may be coupled to an upper part of pipe 300, and surface water collection apparatus 100 may provide the collected water to the upper part of pipe 300. Further, surface water collection apparatus 100 may be formed as, but not limited to, a semicircular container or tube. In some embodiments, surface water collection apparatus 100 may be an eaves gutter.

Filter 200 may be positioned between surface water collection apparatus 100 and pipe 300. In some embodiments, filter 200 may be positioned upstream of UV lamps 400 in pipe 300. Further, filter 200 may filter the water collected by surface water collection apparatus 100. By way of example, filter 200 may filter floating particles in the water collected by surface water collection apparatus 100. Filter 200 may include, but not limited to, a downspout filter, a cartridge filter, a fiber filter, a filter sock or a sand filter.

Pipe 300 may allow the water collected by surface water collection apparatus 100 to flow therethrough. The water flowing through pipe 300 may be provided to container 500. Further, pipe 300 may be formed into various shapes, and examples of suitable shapes of pipe 300 will be explained in detail with reference to FIGS. 4 to 6.

UV lamps 400 may sterilize the water flowing through pipe 300. UV lamps 400 may be arranged along pipe 300, and the water flowing through pipe 300 may be sterilized by UV light from UV lamps 400. UV lamps 400 may include, but not limited to, ultraviolet fluorescent lamps, ultraviolet LEDs (light-emitting diodes), ultraviolet lasers or gas-discharge lamps. In some embodiments, UV lamps 400 may be a low-power UV lamp. By way of example, UV lamps 400 may include, but not limited to, a low-pressure mercury lamp with a wavelength of about 254 nm.

As depicted in FIG. 1, UV lamps 400 may be arranged in series at regular intervals along pipe 300. In some embodiments, UV lamps 400 may be arranged in various ways instead of in series, and this will be explained in detail with reference to FIGS. 7 and 8.

Container 500 may be operably coupled to pipe 300 and store the water that has flowed through pipe 300. By way of example, container 500 may be connected to a lower part of pipe 300.

Figure 2:
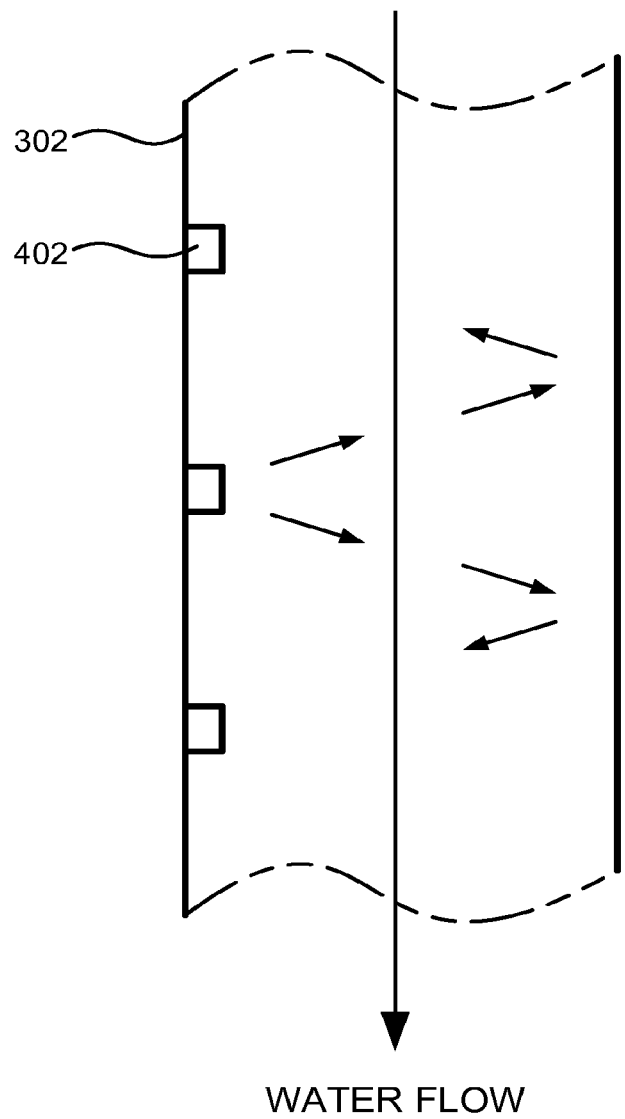
FIG. 2 is a cross-sectional view of a pipe and a multiple number of UV lamps arranged along an inner wall of the pipe.

FIG. 2 is a cross-sectional view of a pipe and a multiple number of UV lamps arranged along an inner wall of the pipe arranged in accordance with at least some embodiments described herein.

As depicted in FIG. 2, a multiple number of UV lamps 402 may be arranged along an inner wall of a pipe 302. The water collected by surface water collection apparatus 100 may flow down through pipe 302, and UV lamps 402 may irradiate UV light to sterilize the water flowing down through pipe 302. An inner wall of pipe 302 may be configured to reflect the UV light from UV lamps 402 in order to more effectively sterilize the water flowing down through pipe 302. By way of example, the inner wall of pipe 302 may be treated with reflective materials. The reflective materials may include, but not limited to, titanium dioxide or zinc oxide.

Further, the number and arrangement intervals of UV lamps 402 may be determined by the amount of UV radiation required to sterilize the water flowing down through pipe 302. The following Table 1 shows the amount of UV radiation per square centimeter (Au) required to break down (inactivate) the indicated microorganisms.

TABLE 1

| Microorganism | Amount of UV radiation required for 99.9% inactivation (Au, mJ/cm$^2$) |
|---|---|
| Colon bacillus | 5.4 |
| Cholera bacillus | 10.2 |

TABLE 1-continued

| Microorganism | Amount of UV radiation required for 99.9% inactivation (Au, mJ/cm$^2$) |
|---|---|
| Legionella | 7.5 |
| Pseudomonas aeruginosa | 16.5 |
| Hemolytic streptococci | 7.5 |
| Staphylococcus aureus | 9.3 |
| Grass bacillus | 21.6 |
| Adenovirus | 90.0 |
| Rotavirus | 24.0 |
| Influenza virus | 6.6 |
| Blue-green alga | 120-180 (suppression of growth) |
| Soil, crop, and hay molds | 88.2 |
| Soil and crop molds | 120.0 |

The amount of UV radiation per unit cross-sectional area (Ac) of pipe 302 required to break down the indicated microorganism can be obtained from Equation 1 below. Further, the sterilization time per unit cross-sectional area (T) of pipe 302 required to break down the indicated microorganism can be obtained from Equation 2 below.

$$A_C = \pi r^2 \cdot A_U \quad \text{[Equation 1]}$$

$$T = A_C / O_U \quad \text{[Equation 2]}$$

In Equations 1 and 2, r denotes an inner radius of pipe 302, and Ou denotes a UV output of UV lamps 402.

In the case of colon bacillus, as can be seen in Table 1, the amount of UV radiation required to inactivate colon bacillus is 5.4 mJ/cm$^2$. Thus, the number and arrangement of UV lamps 402 need to generate UV radiation of at least 5.4 mJ/cm$^2$ to inactivate the colon bacillus in the water. Assuming that the inner diameter (2r) of pipe 302 is 7 cm, according to Equation 1 above, about 0.2 J of UV radiation is required per unit cross-sectional area of pipe 302 to inactivate colon bacillus. In order to achieve the desired result using 1.7 W UV lamps 402 (for example, Sankyo Denki's Double-Tube Germicidal Lamp, Model GLK8MΩ), according to Equation 2 above, sterilization time of about 0.12 seconds is required per unit cross-sectional area to inactivate the colon bacillus in the water. Assuming that the water is flowing down through pipe 302 at a speed of 1 msec, the water will flow 12 cm in 0.12 seconds. Therefore, the length of the pipe required for the sterilization process (the inactivation of colon bacillus) is about 12 cm. By way of example, assuming a one-story building is about 3 meters in height, a pipe of length 3 meters (from the roof of the one-story building down to the ground) can be provided for the sterilization process and thus, the length of the pipe should be sufficient for the inactivation of colon bacillus. In such a configuration, one UV lamp generating a UV output of 1.7 W arranged within an inner wall of the pipe is sufficient to inactivate colon bacillus contained in the water flowing through the pipe.

As another example, in case of blue-green algae, as can be seen in Table 1, the amount of UV radiation required to inactivate blue-green algae is 120 mJ/cm$^2$. Thus, the number and arrangement of UV lamps 402 need to generate UV radiation of at least 120 mJ/cm$^2$ to inactivate the blue-green algae in the water. Assuming that the inner diameter (2r) of pipe 302 is 7 cm, according to Equation 1 above, about 4.6 J of UV radiation is required per unit cross-sectional area of pipe 302 to inactivate blue-green algae. In order to achieve the desired result using 0.8 W UV lamps (for example, a low-pressure mercury lamp of 0.8 W), according to Equation 2 above, sterilization time of about 6 seconds is required per unit cross-sectional area to inactivate blue-green algae contained in the water. Assuming that the water is flowing down through pipe 302 at a speed of 1 msec, the water will flow 6 meters in 6 seconds. Therefore, the length of the pipe required for the sterilization process (the inactivation of blue-green algae) is about 6 m. By way of example, assuming a two-story building is about 6 meters in height, a pipe of length 6 meters (from the roof of the one-story building down to the ground) can be provided for the sterilization process and thus, the length of the pipe should be sufficient for the inactivation of blue-green algae contained in the water flowing through the pipe.

As discussed above, the number and arrangement intervals of UV lamps 402 are determined by the amount of UV light from UV lamps 402 required to sufficiently break down (inactivate) microorganisms contained in water while the water flows down through pipe 302. Examples of microorganism include, but are not limited to, colon bacillus, cholera bacillus, legionella, pseudomonas aeruginosa, hemolytic streptococci, staphylococcus aureus, grass bacillus, adenovirus, rotavirus, influenza virus, or blue-green alga.

Figure 3:
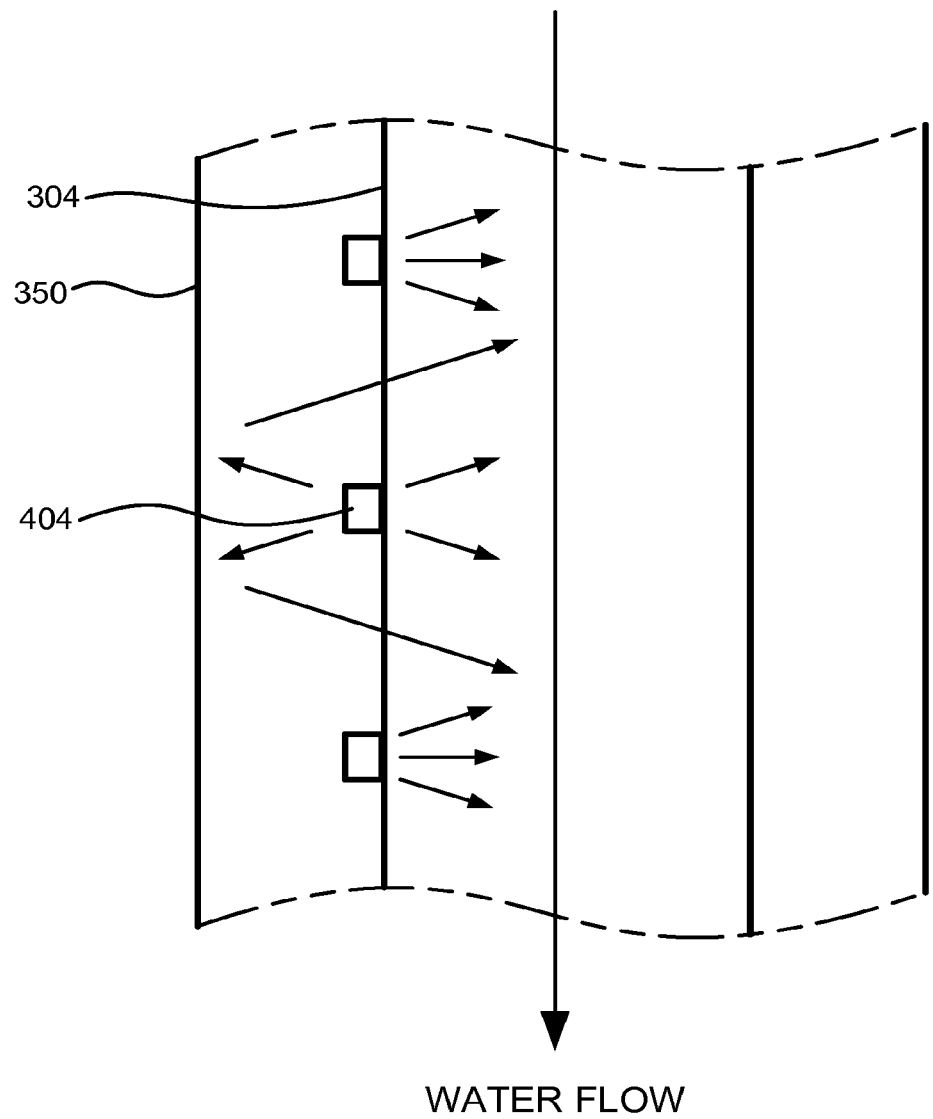
FIG. 3 is a cross-sectional view of inner and outer pipes and a multiple number of UV lamps arranged along an outer wall of the inner pipe.

FIG. 3 is a cross-sectional view of inner and outer pipes and a multiple number of UV lamps arranged along an outer wall of the inner pipe arranged in accordance with at least some embodiments described herein.

As depicted in FIG. 3, a multiple number of UV lamps 404 may be arranged along an outer wall of an inner pipe 304. Inner pipe 304 may be transparent to the UV light, and UV light from UV lamps 404 may penetrate pipe 304 and sterilize water flowing through inner pipe 304.

In this case, the water sterilizing apparatus may further include an outer pipe 350 which is configured to surround inner pipe 304 and UV lamps 404. Outer pipe 350 may be non-transparent to UV light, and an inner wall of outer pipe 350 may be configured to reflect UV light from UV lamps 404 in order to more effectively sterilize the water flowing down through inner pipe 304. By way of example, the inner wall of outer pipe 350 may be treated with reflective materials. The reflective materials may include, but not limited to, titanium dioxide or zinc oxide.

Figure 4:
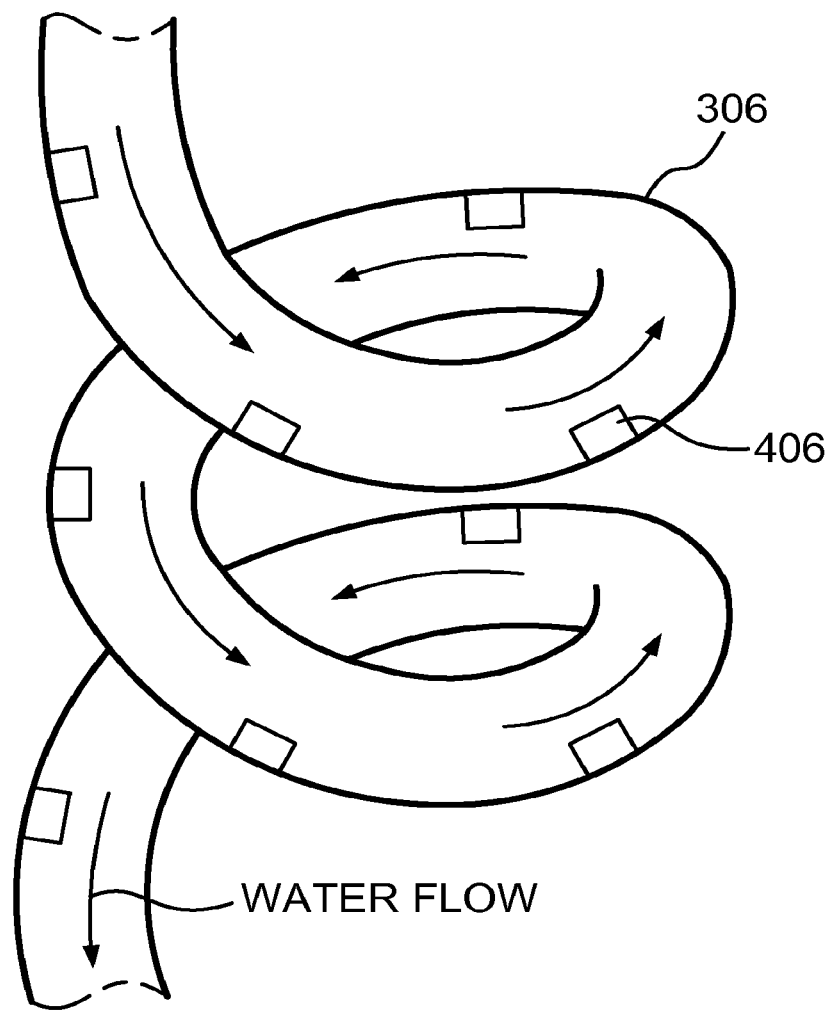
FIG. 4 shows a pipe formed in a spiral shape.

FIG. 4 is a cross-sectional view of a pipe formed in a spiral shape arranged in accordance with at least some embodiments described herein.

As depicted in FIG. 4, a pipe 306 may be formed in a spiral shape. In this configuration, the velocity of water flowing through pipe 306 may be decreased and the water flowing through a spiral shaped pipe may be exposed to UV light for a longer period of time than if the water was flowing through a linear pipe, such as the pipes shown in FIGS. 2 and 3. Further, with respect to the same height, the length of pipe 306 is longer than that of a linear pipe, and thus, it may be easier to provide the desired amount of UV light to the water flowing through pipe 306.

Figure 5:
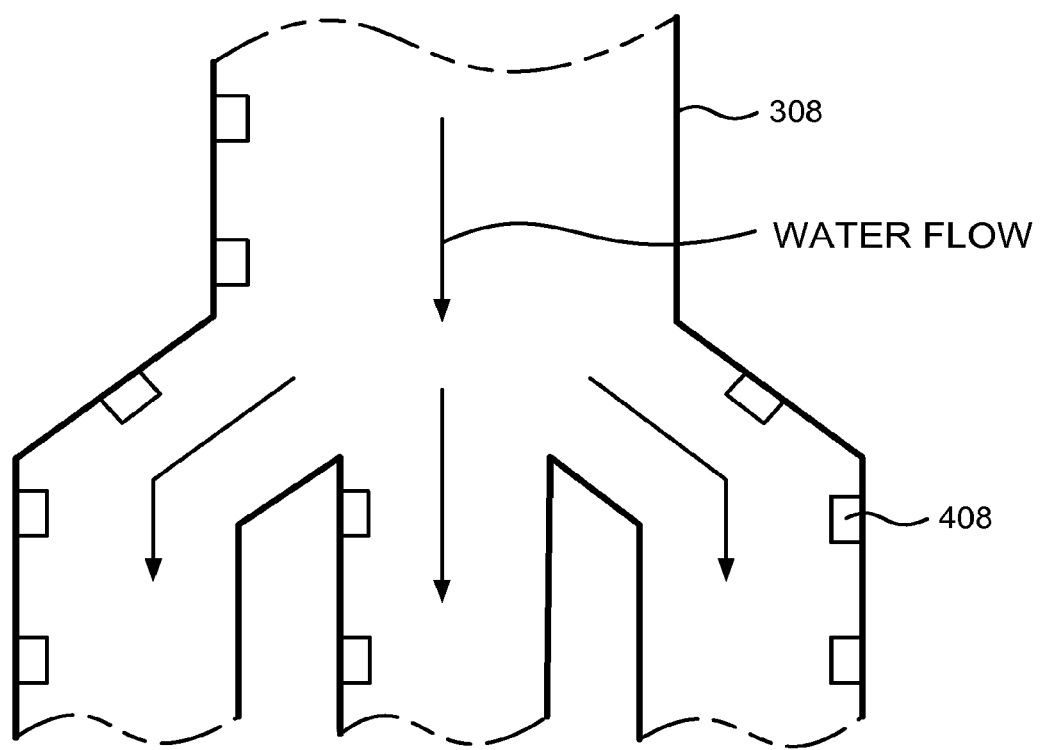
FIG. 5 is a cross-sectional view of a pipe branching into a multiple number of passages.

FIG. 5 is a cross-sectional view of a pipe branching into a multiple number of passages arranged in accordance with at least some embodiments described herein.

As depicted in FIG. 5, a pipe 308 may branch into a multiple number of passages, and a multiple number of UV lamps 408 may be arranged along pipe 308 and each of its passages. In this configuration, the total cross-sectional area of the multiple number of passages may be larger than the cross-sectional area of pipe 308. Thus, the desired amount of UV light may be provided to the water flowing through pipe 308 without having to reduce the speed of the water flowing down through pipe 308.

Figure 6:
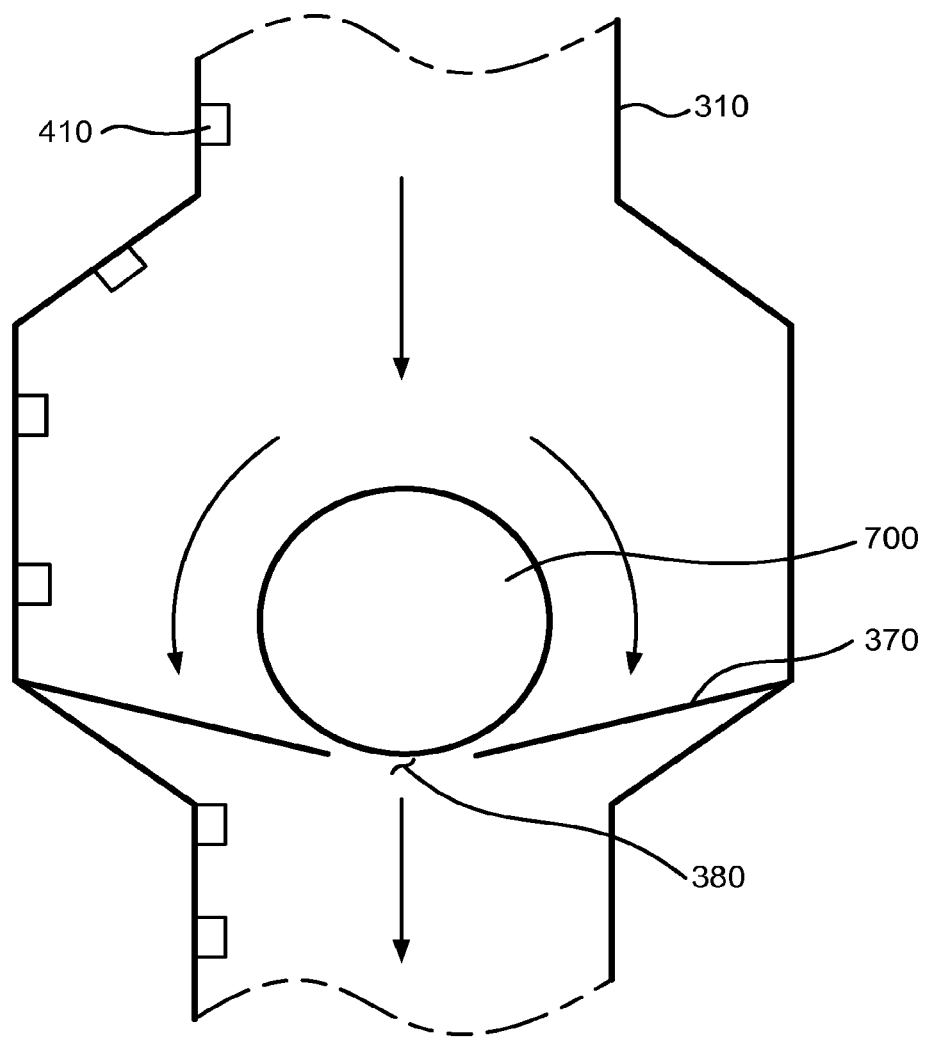
FIG. 6 is a cross-sectional view of a pipe including a partition wall and a floating ball positioned above the partition wall.

FIG. 6 is a cross-sectional view of a pipe including a partition wall and a floating ball positioned above the partition wall arranged in accordance with at least some embodiments described herein.

As depicted in FIG. 6, a pipe 310 of an illustrative embodiment of a water sterilizing apparatus may include a partition wall 370 having a hole 380 therein, and a floating ball 700 may be positioned on hole 380 of partition wall 370. Floating ball 700 may have a diameter that is greater than that of hole 380. In some embodiments, partition wall 370 may be formed so as to be inclined down toward hole 380. In some embodiments, partition wall 370 and floating ball 700 may be transparent to UV light.

In the above configuration, the water flowing through pipe 310 stays or remains on partition wall 370 for a while due to floating ball 700 blocking up hole 380. Stated another way, the flow of water through pipe 310 is delayed due to floating ball 700 blocking hole 380. When enough water collects on or above partition wall 370 to cause floating ball 700 to float, the water may flow down partition wall 370, through hole 380, and down pipe 310. Because the flow of water is delayed, the water flowing through pipe 310 can be provided with more UV light from UV lamps 410.

Further, the cross-sectional area of the portion of pipe 310 where floating ball 700 is positioned is larger than the cross-sectional area of the other portions of pipe 310. Thus, when floating ball 700 positioned on partition wall 370 floats, the water may flow smoothly down partition wall 370.

Figure 7:
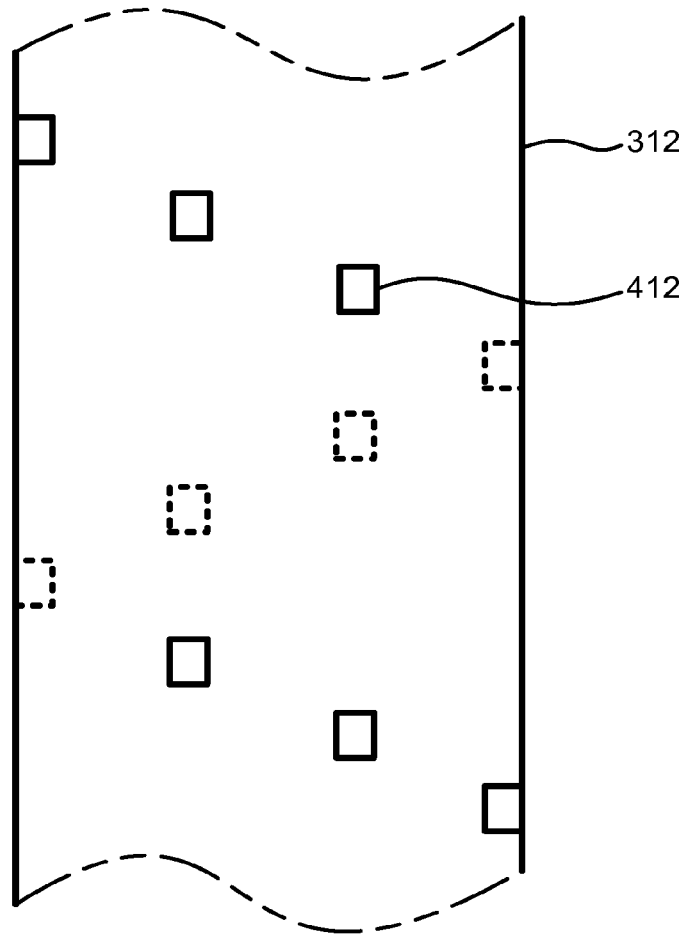
FIG. 7 shows UV lamps arranged in a spiral shape along a pipe.

FIG. 7 shows UV lamps arranged in a spiral shape along a pipe arranged in accordance with at least some embodiments described herein.

As depicted in FIG. 7, UV lamps 412 may be arranged in a spiral shape along pipe 312. In this case, the water flowing through pipe 312 may be exposed to UV light irradiated by UV lamps 412 from various directions.

Figure 8:
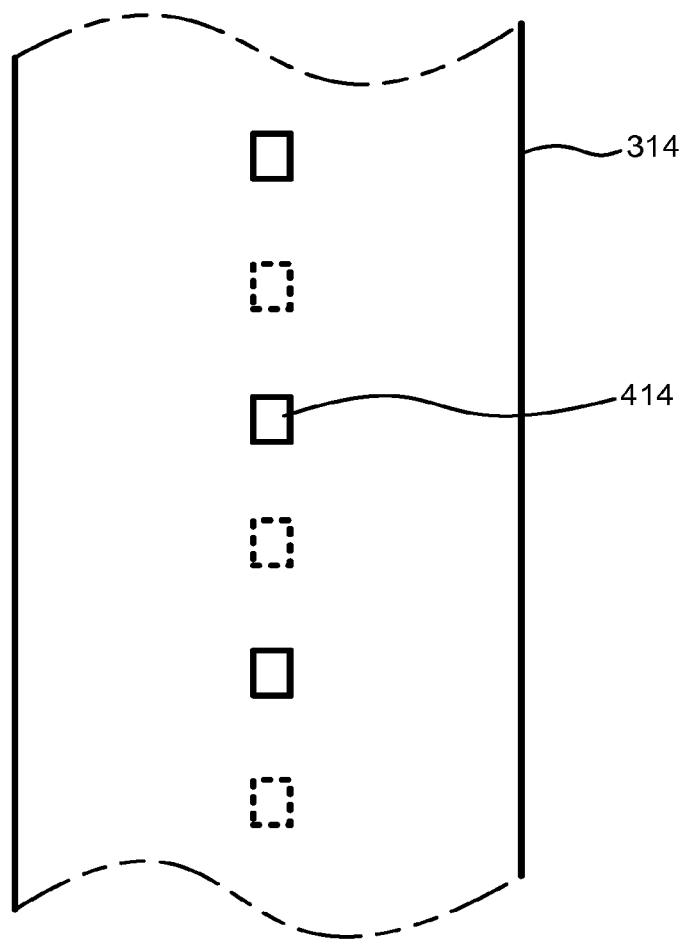
FIG. 8 shows UV lamps arranged so as to face each other along a pipe.

FIG. 8 shows UV lamps arranged so as to face each other along a pipe arranged in accordance with at least some embodiments described herein.

As depicted in FIG. 8, UV lamps 414 may be arranged so as to face each other along a pipe 314. In this case, the water flowing through pipe 314 may be exposed to UV light irradiated by UV lamps 414 from both directions.

Figure 9:
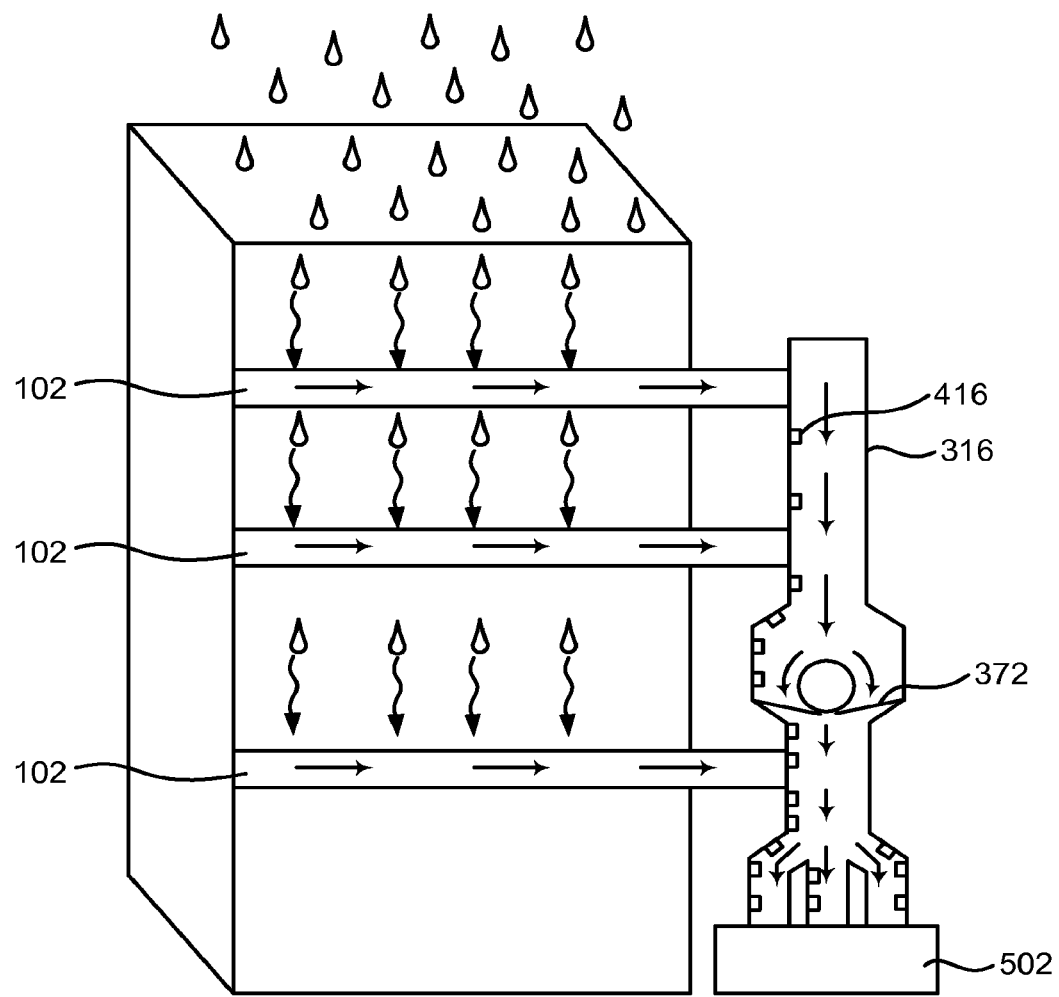
FIG. 9 illustrates a water sterilizing apparatus having a multiple number of surface water collection apparatuses provided on a wall of a structure.

FIG. 9 illustrates a water sterilizing apparatus having a multiple number of surface water collection apparatuses provided on a wall of a structure arranged in accordance with at least some embodiments described herein.

As depicted in FIG. 9, surface water collection apparatuses 102 may be provided on a wall of a structure and may collect surface water collected on and flowing off of the wall of the structure. Further, surface water collection apparatuses 102 may be provided at predetermined intervals on the wall of the structure, and each of surface water collection apparatuses 100 may provide the collected surface water into a pipe 316. The water collected by surface water collection apparatuses 102 may flow down through pipe 316, and a multiple number of UV lamps 416 may irradiate UV light to sterilize the water flowing down through pipe 316. In this configuration, pipe 316 may include a floating ball positioned above a partition wall 372 and may branch into a multiple number of passages, as explained above.

Although it has been illustrated that the water sterilizing apparatus includes the multiple number of surface water collection apparatuses in FIG. 9, the present disclosure is not limited thereto, and the water sterilizing apparatus may have one surface water collection apparatus 102 provided on the wall of the structure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A water sterilizing apparatus comprising:
   a surface water collection apparatus configured to collect surface water;
   a pipe operably coupled to the surface water collection apparatus and configured to allow water collected by the surface water collection apparatus to flow through the pipe;
   a plurality of UV lamps arranged along an inner wall of the pipe and configured to emit UV light to sterilize water flowing through the pipe;
   a partition wall provided within the pipe and having a hole therein; and
   a floating object positioned on the hole and configured to be floated by water flowing through the pipe.

2. The water sterilizing apparatus of claim 1, further comprising:
   a filter positioned upstream of the plurality of UV lamps and configured to filter the water collected by the surface water collection apparatus.

3. The water sterilizing apparatus of claim 1, further comprising:
   a container operably coupled to the pipe and configured to store the water that has flowed through the pipe.

4. The water sterilizing apparatus of claim 1, wherein a cross-sectional area of a portion of the pipe where the floating object is positioned is larger than a cross-sectional area of another portion of the pipe.

5. The water sterilizing apparatus of claim 1, wherein the pipe branches into a plurality of passages, wherein at least one of the plurality of UV lamps is arranged along an inner wall of each of the plurality of passages.

6. The water sterilizing apparatus of claim 5, wherein a total cross-sectional area of the plurality of passages is larger than a cross-sectional area of the pipe.

7. The water sterilizing apparatus of claim 1, wherein the pipe is formed in a spiral shape.

8. The water sterilizing apparatus of claim 1, wherein the inner wall of the pipe is configured to reflect the UV light from the plurality of UV lamps.

9. The water sterilizing apparatus of claim 1, wherein the plurality of UV lamps are arranged in a spiral shape along the inner wall of the pipe.

10. The water sterilizing apparatus of claim 1, wherein the plurality of UV lamps are arranged so as to face each other along the inner wall of the pipe.

11. The water sterilizing apparatus of claim 1, wherein the water is rainwater.

12. The water sterilizing apparatus of claim 11, wherein the surface water collection apparatus is provided on a roof.

13. The water sterilizing apparatus of claim 11, wherein the surface water collection apparatus is provided on a wall of a structure.

14. The water sterilizing apparatus of claim 1, wherein the floating object is a floating ball.

15. A water sterilizing apparatus comprising:
   a surface water collection apparatus configured to collect surface water;
   a pipe operably coupled to the surface water collection apparatus and configured to allow water collected by the surface water collection apparatus to flow through the pipe, wherein the pipe is transparent to UV light; a plurality of UV lamps arranged along an outer wall of the pipe and configured to emit UV light to sterilize water flowing through the pipe;
   a partition wall provided within the pipe and having a hole therein; and
   a floating object positioned on the hole and configured to be floated by water flowing through the pipe.

16. The water sterilizing apparatus of claim 15, further comprising:
   an outer pipe configured to surround the pipe and the plurality of UV lamps, wherein the outer pipe is non-transparent to the UV light.

17. The water sterilizing apparatus of claim 16, wherein an inner wall of the outer pipe is configured to reflect the UV light from the plurality of UV lamps.

18. The water sterilizing apparatus of claim 15, further comprising:
   a filter positioned upstream of the plurality of UV lamps and configured to filter the water collected by the surface water collection apparatus.

19. The water sterilizing apparatus of claim 15, further comprising:
   a container operably coupled to the pipe and configured to store the water that has flowed through the pipe.

20. The water sterilizing apparatus of claim 15, wherein a cross-sectional area of a portion of the pipe where the floating object is positioned is larger than a cross-sectional area of another portion of the pipe.

21. The water sterilizing apparatus of claim 15, wherein the pipe branches into a plurality of passages, wherein at least one of the plurality of UV lamps is arranged along an outer wall of each of the plurality of passages.

22. The water sterilizing apparatus of claim 21, wherein a total cross-sectional area of the plurality of passages is larger than a cross-sectional area of the pipe.

23. The water sterilizing apparatus of claim 15, wherein the pipe is formed in a spiral shape.

24. The water sterilizing apparatus of claim 15, wherein the plurality of UV lamps are arranged in a spiral shape along the outer wall of the pipe.

25. The water sterilizing apparatus of claim 15, wherein the plurality of UV lamps are arranged so as to face each other along the outer wall of the pipe.

26. The water sterilizing apparatus of claim 15, wherein the water is rainwater.

27. The water sterilizing apparatus of claim 26, wherein the surface water collection apparatus is provided on a roof.

28. The water sterilizing apparatus of claim 26, wherein the surface water collection apparatus is provided on a wall of a structure.

29. The water sterilizing apparatus of claim 15, wherein the floating object is a floating ball.

\* \* \* \* \*

UNITED STATES PATENT AND TRADEMARK OFFICE
CERTIFICATE OF CORRECTION

| | |
|---|---|
| PATENT NO. | : 9,199,864 B2 |
| APPLICATION NO. | : 13/395540 |
| DATED | : December 1, 2015 |
| INVENTOR(S) | : Shinagawa |

Page 1 of 1

It is certified that error appears in the above-identified patent and that said Letters Patent is hereby corrected as shown below:

In the specification,

In Column 4, Line 38, delete "GLK8M$\Omega$)," and insert -- GLK8MQ), --, therefor.

In Column 4, Line 42, delete "1 msec," and insert -- 1 m/sec, --, therefor.

In Column 5, Line 1, delete "1 msec," and insert -- 1 m/sec, --, therefor.

Signed and Sealed this
Twenty-first Day of June, 2016

Michelle K. Lee
*Director of the United States Patent and Trademark Office*